United States Patent [19]

Walker et al.

[11] Patent Number: 5,593,181
[45] Date of Patent: Jan. 14, 1997

[54] GENERANT WAFER CORE IGNITION SYSTEM FOR PASSENGER SIDE AIRBAG INFLATOR

[75] Inventors: Kerry C. Walker; David W. Parkinson, both of North Ogden, Utah

[73] Assignee: Morton International, Inc., Chicago, Ill.

[21] Appl. No.: 616,697

[22] Filed: Mar. 15, 1996

[51] Int. Cl.$^6$ .................................................. B60R 21/28
[52] U.S. Cl. ............................................ 280/741; 102/530
[58] Field of Search .................................. 280/736, 741, 280/742; 102/530, 531, 443

[56] References Cited

U.S. PATENT DOCUMENTS

| | | | |
|---|---|---|---|
| 3,555,816 | 1/1971 | Leasure et al. | 102/531 |
| 3,972,545 | 8/1976 | Kirchoff et al. | 280/741 |
| 4,593,622 | 6/1986 | Fibranz | 102/530 |
| 4,822,572 | 4/1989 | Van Der Smissen et al. | 102/530 |
| 4,950,458 | 8/1990 | Cunningham | 280/741 |
| 4,998,751 | 3/1991 | Paxton et al. | 280/741 |
| 5,345,875 | 9/1994 | Anderson | 280/741 |
| 5,529,335 | 6/1996 | Bohmler | 280/741 |

*Primary Examiner*—Paul N. Dickson
*Attorney, Agent, or Firm*—Philip C. Peterson; Gerald K. White

[57] ABSTRACT

An airbag inflator including a stack of gas generant wafers, each having a central core opening and the stack contained in an elongated housing having an initiator at one end. The initiator is aligned with an elongated passage formed by aligned core openings of the stack of gas generant wafers contained in the housing. A thin disk extends across the elongated passage dividing the passage into smaller separate core chambers. A charge of granular pyrotechnic ignition material is contained in one of the core chambers formed between the disk and the initiator. Activation of the initiator causes ignition of the pyrotechnic material in the adjacent core chamber which in turn ignites the adjacent gas generant wafers. Ignition of the pyrotechnic ignition material and the gas generant wafers causes the thin disk to be consumed or rupture so that the gas generant wafers forming the other chamber are also ignited.

20 Claims, 1 Drawing Sheet

GENERANT WAFER CORE IGNITION SYSTEM FOR PASSENGER SIDE AIRBAG INFLATOR

BACKGROUND OF THE INVENTION

1. Field of the Invention

The present invention relates to airbag inflators and more particularly to airbag inflators designed for use on the passenger side of a vehicle behind an instrument panel rather than on the driver's side, which inflators are commonly mounted on the steering wheel. The present invention also relates to pyrotechnic type airbag inflators wherein gas generating pyrotechnic materials are utilized to provide a source of gas for rapid inflation of an associated airbag.

2. Background of the Prior Art

In prior art passenger side airbag inflators of the pyrotechnic type which have worked well, a relatively expensive type igniter is utilized to ignite a stack of washer-like wafers comprising a solid form of gas generant material such as sodium azide. These prior art igniters include an elongated, perforated metal tube wrapped with an adhesive backed metal foil such as a thin aluminum foil and inserted into a central passage of the stack of gas generant wafers.

The igniter tube is filled with granular ignition material and a rapid deflagration cord (RDC) having an adapter cup crimped onto one end and closed with a screen for containing the ignition granules. An exposed length of RDC and a stand off distance are critical features that require close inspection and contribute to the relatively high cost of these igniters. Moreover, prior art igniter tubes provide reduced heat transfer, and tend to confine the granules that distribute hot gas and prevent hot granules from easily spreading throughout the airbag inflator to help ignite the gas generant wafers.

OBJECTS OF THE INVENTION

It is therefor an important object of the present invention to provide a new and improved passenger side, pyrotechnic type airbag inflator and more particularly such an inflator utilizing a new and improved gas generant wafer core ignition system.

Yet another object of the present invention is to provide a new and improved airbag inflator of the character described having an ignition system which does not utilize or require a perforated metal tube for holding granular ignition material or a rapid deflagration cord (RDC).

Still another object of the present invention is to provide a new and improved ignition system for an airbag inflator which provides improved heat transfer for igniting the gas generant material and which enhances the dispersion of hot gas and ignition material throughout the inflator for better, more efficient ignition of the gas generant wafers.

Still another object of the present invention is to provide a new and improved airbag inflator wherein a length of a core passage formed by central openings in a stack of gas generant wafers and closed by a thin consumable disk intermediate the ends of the stack form a chamber for containing ignition material for igniting the gas generant wafers.

Yet another object of the present invention is to provide a new and improved ignition system for an airbag inflator of the type described in the preceding object wherein granular ignition material for igniting the gas generant wafers also causes the thin disk to be consumed or ruptured so that the hot gas and granular ignition particles can move through the entire core passage for better heat transfer and more efficient ignition of the gas generant wafers.

Still another object of the present invention is to provide a new and improved ignition system for an airbag inflator which is easier and less expensive to manufacture, easier to produce and assemble with a minimal impact or change for currently produced inflator and assembly tooling and requiring fewer piece parts or components than required in prior art inflators.

BRIEF SUMMARY OF THE PRESENT INVENTION

The foregoing and other objects and advantages of the present invention are accomplished in a new and improved ignition system for an airbag inflator of the type including an elongated housing having a side wall and opposite end walls for containing a stack of gas generant, solid material, wafers therein. Each of the wafers is formed with a central opening aligned with a central opening of an adjacent wafer in the stack, thereby forming an elongated central core passage extending between opposite end walls of the housing. An initiator is provided adjacent one of the end walls aligned with the central core passage. A thin disk is mounted in the stack of gas generant wafers dividing the stack into separate first and second part stacks and thus dividing the elongated central core passage into separate, shorter first and second chambers. Each wafer has a cylindrical side wall formed by the internal bore surfaces of the gas generant wafers defined by the central openings thereof. A body of ignition material is contained in the first chamber between the initiator and the thin disk for igniting the gas generant wafers of the first part stack upon activation of said initiator. The thin disk is ruptured and/or consumed, so that the hot gas and ignition particles can move into the second chamber and ignite the gas generant wafers in the second part stack for inflating the airbag with gas.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Referring now more particularly to the drawings, therein is illustrated a passenger side, pyrotechnic type airbag inflator 10 designed to rapidly inflate an associated airbag to provide cushioning restraint for a passenger in a motor vehicle.

Figure 1:
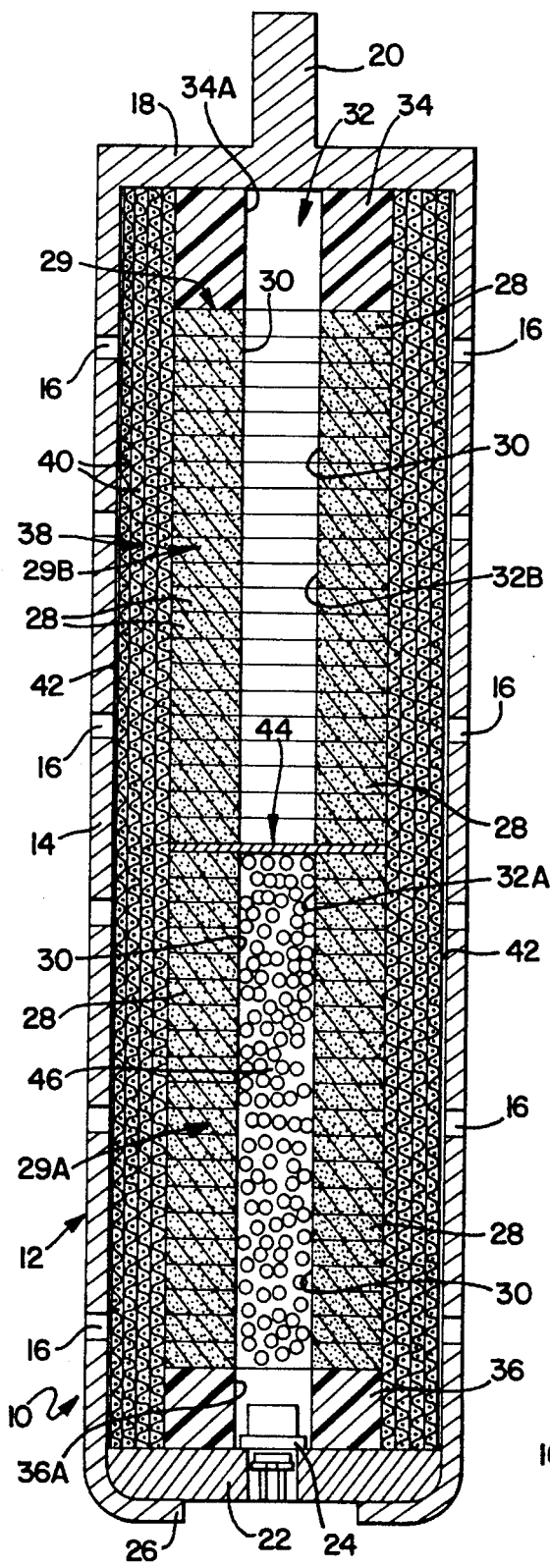
FIG. 1 is a longitudinal, centrally disposed, cross-sectional view of a new and improved airbag inflator including a new and improved ignition system constructed in accordance with the features of the present invention.
Figure 2:
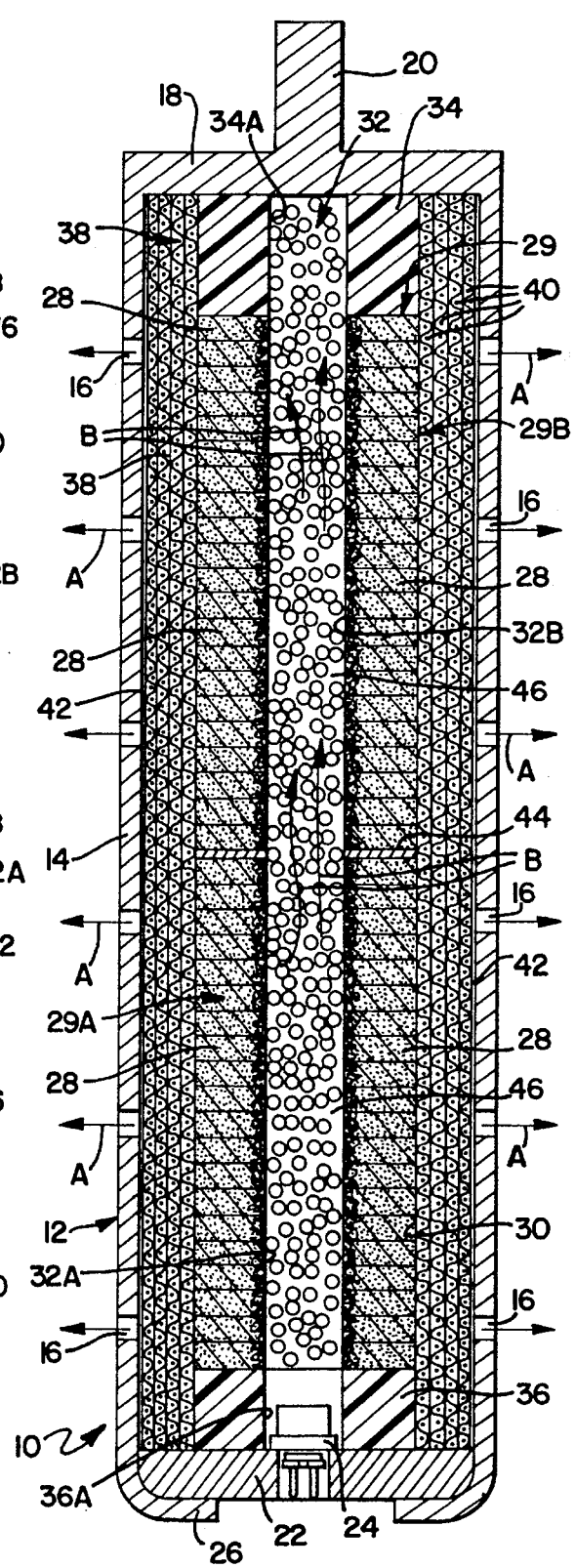
FIG. 2 is a cross-sectional view of the inflator after ignition has been commenced and the thin disk previously dividing the central passage into separate chambers has been, ruptured and/or consumed so that the hot gas and ignition granules can move, to ignite all of the gas generant wafers in the whole stack contained in the inflator housing to produce airbag inflation gas.

The airbag inflator 10 is provided with a new and improved ignition system in accordance with the features of the present invention and includes an elongated, generally cylindrical, housing 12 formed of metal such as steel or aluminum and provided with a cylindrical sidewall 14 having a plurality of gas ports or perforations 16 spaced apart around the surface at appropriate intervals for discharging gas (arrows A-FIG. 2) to inflate an associated airbag when the inflator is activated.

The housing 12 is closed at one end with an integral, circular end wall 18 having a centrally located outwardly projecting mounting pin 20 for use in securing the inflator 10 in position behind an instrument panel or dashboard of a motor vehicle. At an opposite end, the housing 12 is closed with an annular, circular end wall 22 having a central aperture for receiving an ignition squib 24 for initiating the gas generating process when it is desired to inflate an associated airbag. The annular end wall 22 is held in place to close the housing 12 by an annular, deformed end flange 26 formed in a metal crimping, rolling or inertia weld process after all of the interior components of the inflator 10 are assembled in place.

Inflation gas is rapidly generated, by the ignition and combustion of a plurality of solid material, gas generant, washer-like, annular, wafers 28 arranged in an elongated cylindrical stack 29 contained within the housing 12 and extending between the opposite end walls 18 and 22. The wafers 28 are formed of solid material such as sodium azide or other types of gas generant material which develops a large volume of relatively inert gas when the wafers are ignited. Each wafer 28 includes a central opening 30 or core passage which forms a short segment of an elongated, centraly, core passage 32 extended through the entire stack 29 of wafers contained in the housing 12 between the opposite end walls 18 and 22. Wafers 28 at opposite ends of the stack 29 are maintained in spaced apart relation to adjacent housing end walls 18 and 22 by means of annular spacers 34 and 36 and the spacers are formed with respective central cores, or passages 34a and 36a, which form opposite end segments of the elongated central passage 32 formed by the wafers 28.

The cylindrical stack 29 of solid gas generant wafers 28 is surrounded by an elongated, hollow, tubular filter 38 for cooling the hot gas generated by the wafers and filtering out hot particulates that might otherwise pass out through the gas discharge ports 16 and cause damage to the inflating airbag and immediate environs. The filter 38 may be formed of several layers 40 of metal screen materials and other types of filter media can also be employed. The inside surface of the housing side wall 14 is sealed with a thin layer of adhesively applied metal foil 42 so that the gas ports 16 are sealed off and the interior of the housing 12 is protected from the entry of contaminants from the outside. The metal foil 42 is readily ruptured by the gas pressure within the housing 12 when the gas generant wafers 28 are ignited so that the generated gas flows freely out through the gas discharge ports 16 to inflate the associated airbag.

In accordance with the present invention, the elongated stack 29 of gas generant wafers 28 and the elongated central core passage 32 thereof is divided intermediate the ends of the stack by a rupturable or consumable thin disk 44. The thin disk 44 can be formed of metal or other suitable material. The thin disk 44 divides the stack 29 into a first part stack 29A adjacent the end wall 22 and a second part stack 29B adjacent the opposite end wall 18. The thin, consumable disk 44 also divides the elongated, central core passage 32 in the wafers 28 into a first ignition chamber or zone 32A and a second hollow or empty ignition chamber or zone 32B.

In the first chamber 32A which can be in contact with or separate from the ignition squib 24 and the adapter cup thereof, there is provided a body or charge of granular ignition material 46, which until ignition occurs is contained at one end by the thin, consumable disk 44 and by the internal bore surface of the central core openings 30 of the gas generant wafers 28.

No containment tube or RDC is present or required and when the squib 44 is activated, the charge of ignition granules 46 is ignited causing the gas generant wafers 28 in the part stack 29A to rapidly ignite for the generation of airbag inflation gas. Because the charge of granular ignition material 46 is in direct contact with the bore surface of the openings 30 in the wafers 28 comprising the first part stack 29A without a RDC or intervening tube wall therebetween, the heat transfer is excellent and the hot gas and granules of the ignition material cause rapid ignition and combustion of the gas generant wafer of the first part stack. This process also results in the rupture and consumption of the thin disk 44 so that the hot gas and ignition granules flow freely to fill the entire length of the central wafer core passage 32 causing the gas generant wafers 28 of the second part stack 29B to ignite and combust to generate inflation gas.

The greatly simplified ignition system as described herein functions exceptionally well and is less expensive than systems using perforated ignition tubes and rapid deflagration cords (RDC). Moreover, fewer parts are required, better heat transfer is attained, acceptable ignition delays are attained in a system which is easy to produce, assemble and manufacture with a minimal impact on existing or current inflator and assembly tooling already in place.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag inflator including a stack of gas generant wafers, each having a central core opening and said stack contained in an elongated housing having an initiator at one end aligned with an elongated passage formed by said core openings of said stack of gas generant wafers, comprising:

a thin disk extending across said core opening passage dividing said passage into separate core chambers; and a charge of granular pyrotechnic ignition material contained in one of said core chambers formed between said disk and said initiator for igniting said gas generant wafers forming said one chamber followed by ignition of said gas generant wafers forming the other chamber after said disk is consumed following activation of said initiator and ignition of said granular pyrotechnic ignition material.

2. The airbag inflator of claim 1, wherein:

said core opening of each gas generant wafer is generally cylindrical and centrally positioned so that said core chambers are centrally disposed, end to end in said elongated housing.

3. The airbag inflator of claim 1, wherein:

said initiator is positioned at an end of said one core chamber opposite said end formed by said thin disk.

4. The airbag inflator of claim 1, wherein:

said thin disk is positioned across said stack of gas generant wafers to divide the stack into separate first and second part stacks.

5. The airbag inflator of claim 4, wherein:

said first part stack provides a containment wall for said pyrotechnic ignition material between said initiator and said thin disk.

6. The airbag inflator of claim 5, wherein:

said second part stack extends from said thin disk to an end of said housing opposite said one end.

7. The airbag inflator of claim 1, wherein:

said stack of gas generant wafers includes opposite end faces spaced inwardly of opposite end walls of said housing.

8. The airbag inflator of claim 7, including:

at least one spacer adjacent said initiator between said one end of said housing and an end face of said stack of gas generant wafers.

9. The airbag inflator of claim 8, wherein:

said spacer has a central opening aligned with said elongated passage of said stack of gas generant wafers.

10. The airbag inflator of claim 9, wherein:

said central opening of said spacer forms a wall portion of said one core chamber.

11. In an ignition system including an elongated housing having a side wall and opposite end walls containing a stack of gas generant wafers therein, each of said wafers formed with a central opening aligned with a central opening of an adjacent wafer of the stack for forming an elongated central passage in said stack of wafers extending between said opposite end walls, and an initiator adjacent one of said end walls aligned with said passage, the improvement comprising:

a thin disk mounted in said stack of generant wafers dividing the same into separate first and second part stacks and dividing said passage into separate first and second chambers having side walls formed by the surfaces of said gas generant wafers defining said central openings thereof; and a body of ignition material contained in said first chamber between said initiator and said disk for igniting said wafers of said first part stack upon activation of said initiator to consume said thin disk and ignite said wafers of said second part stack.

12. The improvement of claim 11, wherein:

said thin disk is positioned intermediate said opposite end walls of said housing.

13. The improvement of claim 11, wherein:

said stack of gas generant wafers has wafers at opposite ends spaced inwardly from adjacent opposite end walls of said housing.

14. The improvement of claim 13, including:

annular spacers in said housing between said opposite end wafers and adjacent facing opposite end walls of said housing.

15. The improvement of claim 14, wherein:

said spacers have central passages in coaxial alignment with said central passage in said stack of gas generant wafers forming wall segments of said first and second chambers.

16. The improvement of claim 11, wherein:

said first chamber has a side wall formed by central openings of said first part stack of said gas generant wafers and opposite end walls formed by said an end wall of said housing and said thin disk.

17. The improvement of claim 11, wherein:

said thin disk is made of material that is consumable by ignition of said ignition material and said gas generant wafers.

18. The improvement of claim 17, wherein:

said thin disk is confronted on opposite faces by inner end gas generant wafers of said first and second part stacks.

19. The improvement of claim 11, wherein:

said initiator is carried on said one end wall of said housing in contact with said body of ignition material for igniting the same when activated.

20. The improvement of claim 19, wherein:

said initiator comprises an electrically activated ignition squib.

* * * * *